United States Patent [19]

Kumm

[11] Patent Number: 4,810,234
[45] Date of Patent: Mar. 7, 1989

[54] CONTINUOUSLY VARIABLE TRANSMISSION

[75] Inventor: Emerson L. Kumm, Tempe, Ariz.

[73] Assignee: Kumm Industries, Inc., Phoenix, Ariz.

[21] Appl. No.: 132,783

[22] Filed: Dec. 14, 1987

Related U.S. Application Data

[63] Continuation-in-part of Ser. No. 51,922, May 19, 1987, Pat. No. 4,768,996.

[51] Int. Cl.$^4$ .................. F16H 11/02; F16H 55/52
[52] U.S. Cl. ................................ 474/49; 474/53; 474/56
[58] Field of Search ........................ 474/49–57

[56] References Cited

U.S. PATENT DOCUMENTS

| 672,962 | 4/1901 | Seymour | 474/53 |
| 4,024,772 | 5/1977 | Kumm | 474/54 X |
| 4,295,836 | 10/1981 | Kumm | 474/53 X |
| 4,591,351 | 5/1986 | Kumm | 474/49 |
| 4,714,452 | 12/1987 | Kumm et al. | 474/49 |

FOREIGN PATENT DOCUMENTS 0026653 2/1984 Japan ................................ 474/56

Primary Examiner—Thuy M. Bui
Attorney, Agent, or Firm—Charles E. Cates; James H. Phillips

[57] ABSTRACT

A continuously variable transmission employing a flat belt extending between driving and driven pulley assemblies, each having a circumferential array of radially adjustable belt engaging elements, is disclosed in conjunction with a control system. The radial positions of the belt engaging elements of each pulley assembly depend upon the angular relationship between inner and outer guideway disk structures carrying logarithmic spiral guideways oriented in the opposite sense. Each pulley assembly includes a power consuming or producing element, such as an oil pump/motor, which is coupled through harmonic drive differential gearing to the guideway disks. When the load on the hydraulic unit operated as a pump is changed by changing the output pressure against which it pumps, the angular relationship between the inner and outer guideway disk structures changes to correspondingly change the positions of the guideway intersections. Since the belt is of fixed length, the other pulley assembly must change its effective diameter in the opposite direction, and this response is facilitated by changing the output pressure of its oil pump in the opposite direction. An alternate configuration and control is disclosed for use when large pulley actuator torques are present due to the centrifugal forces acting upon heavier, stronger belt engaging elements selected for heavier duty applications.

4 Claims, 3 Drawing Sheets

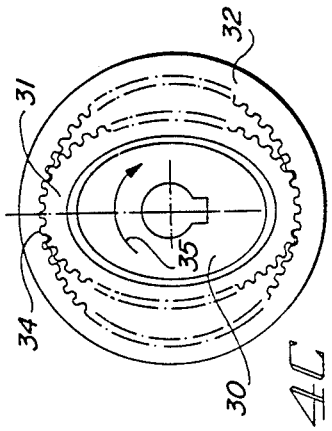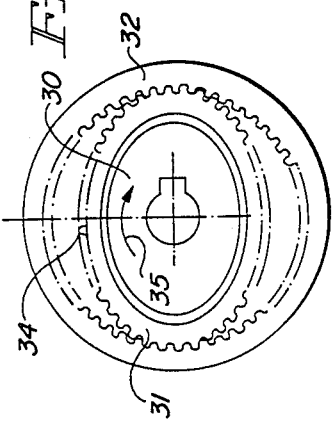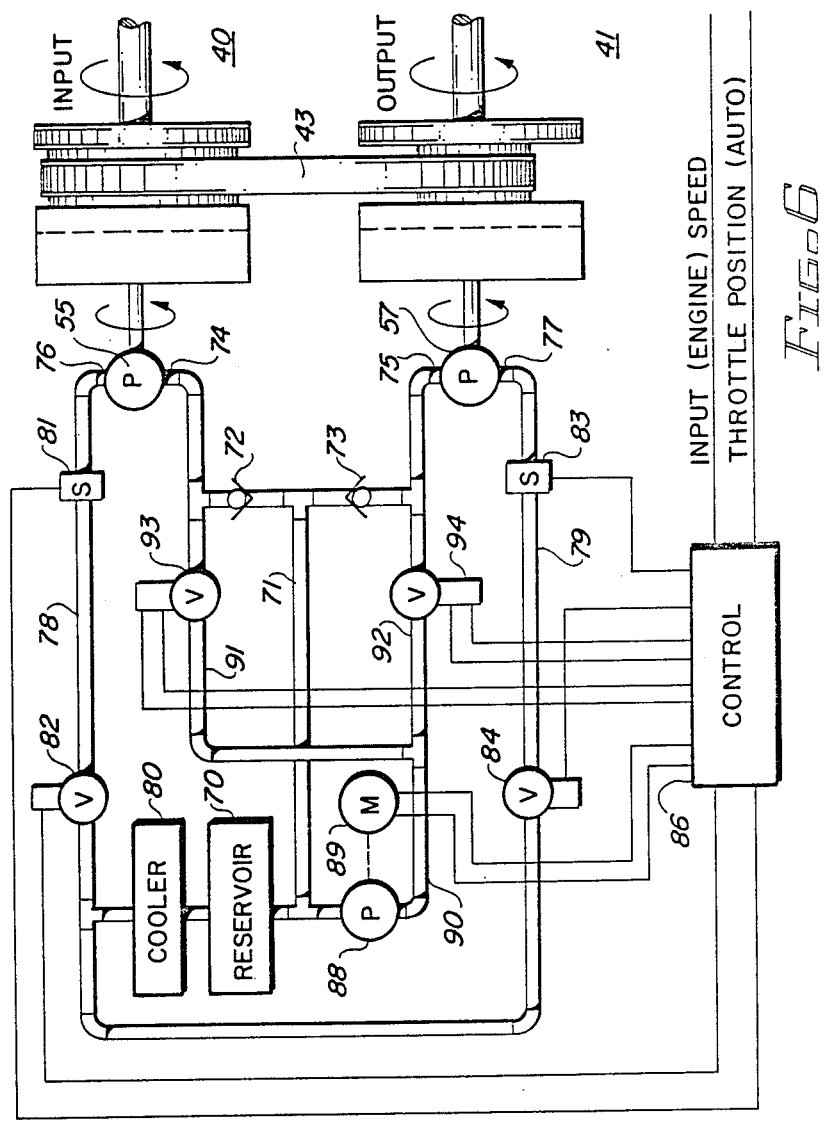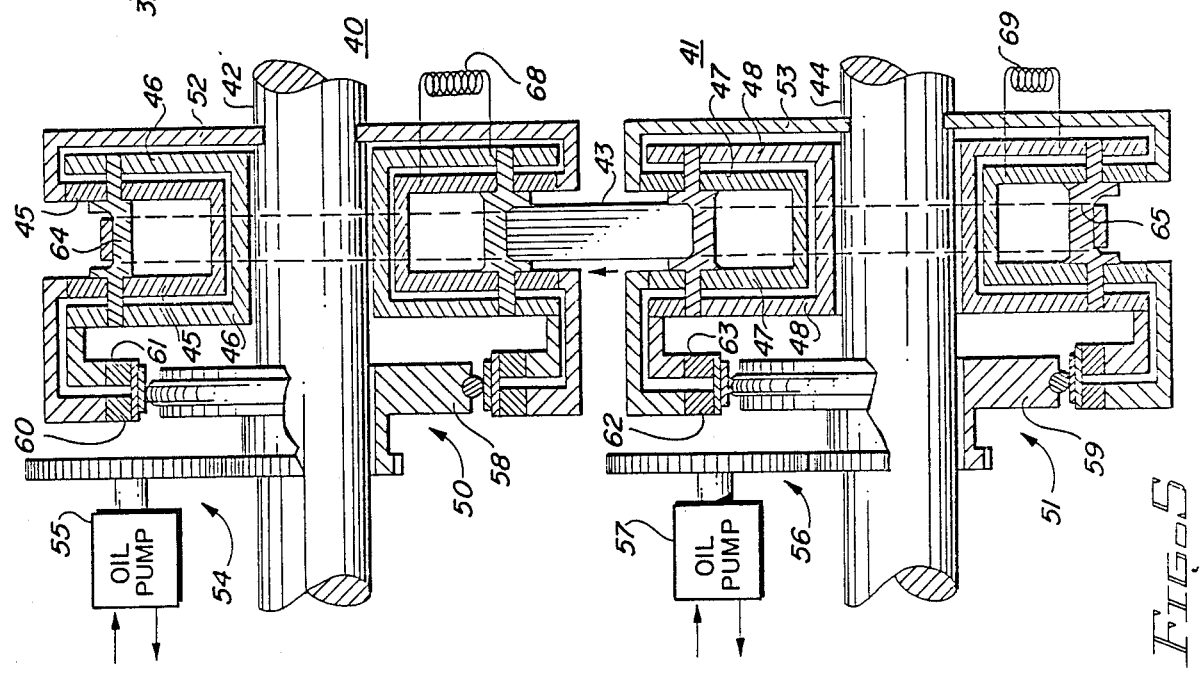

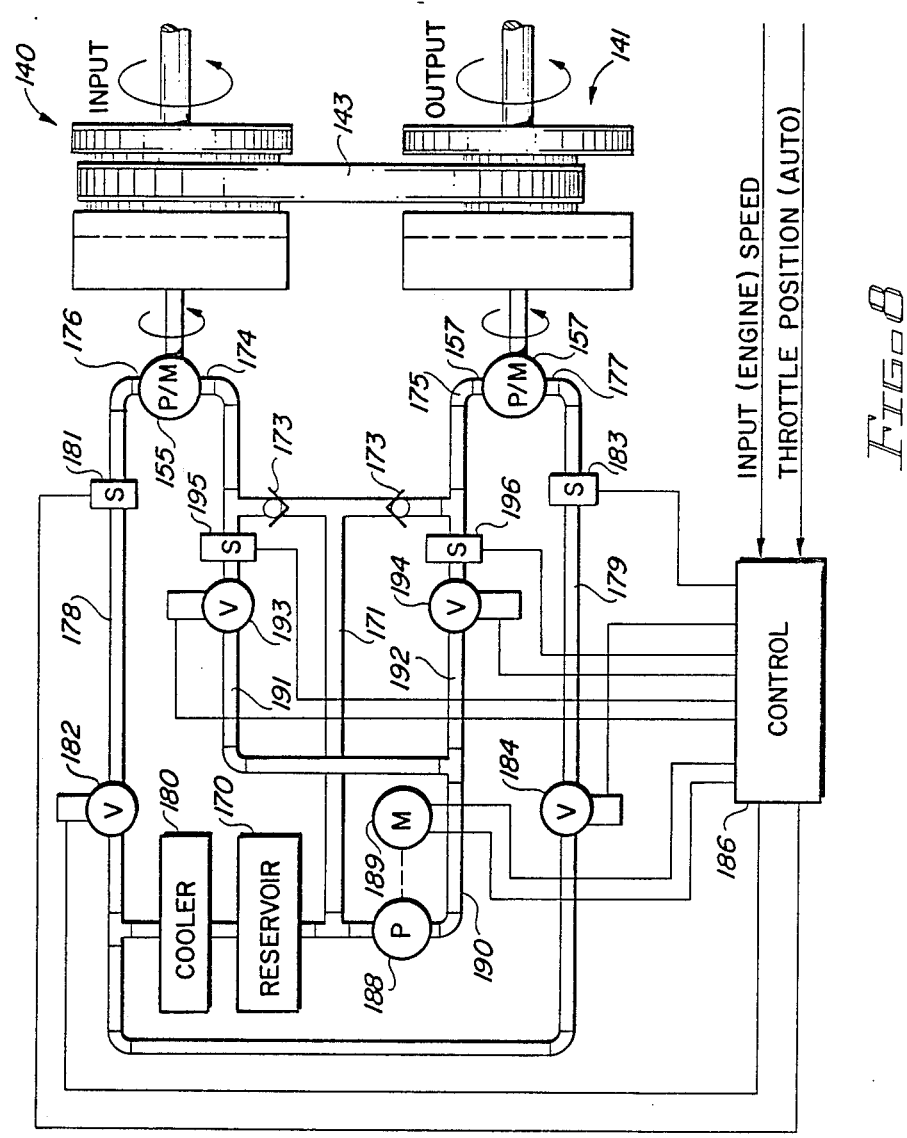
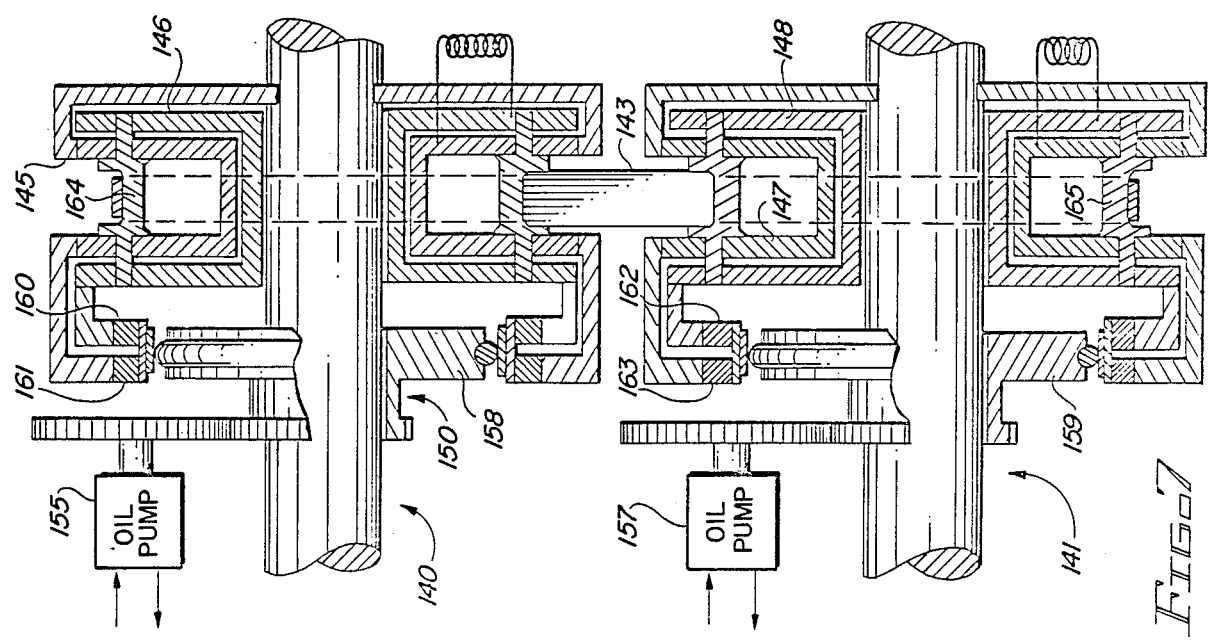

CONTINUOUSLY VARIABLE TRANSMISSION

CROSS REFERENCE TO RELATED APPLICATION

This application is a continuation-in-part of U.S. patent application Ser. No. 051,922, filed May 19, 1987, by Emerson L. Kumm and also entitled CONTINUOUSLY VARIABLE TRANSMISSION, now U.S. Pat. No. 4,768,996.

FIELD OF THE INVENTION

This invention relates to the continuously variable transmission (CVT) art and, more particularly, to a hydraulic/mechanical control system for establishing the speed ratio in a flat belt continuously variable transmission.

BACKGROUND OF THE INVENTION

Continuously variable transmissions of the class broadly characterizable as that in which a belt couples a pair of pulleys, each of which can assume a more or less continuous range of effective diameters, generally fall into two categories; viz: (a) those employing V-belts or variations thereof (such as link belts or chains) for transmitting power from one pulley to the other, and (b) those systems employing flat, flexible belts between the variable diameter pulleys.

Those skilled in the art have come to appreciate the CVT's employing flat, flexible belts enjoy significant fundamental advantages over those systems employing V-belts. In the case of the latter, the belts are composed of various compositions and have a trapezoidal cross section, the belt transmitting rotary motion at one speed from a source of power (such as an engine or motor) to an output shaft at another speed, the speed ratio being varied in a continuous fashion from a minimum to a maximum as dependent on the geometry of the belt and the pulley system. The V-belt is compressed between smooth, conical sheave sections in each of the two pulleys by external axial forces acting on the sections to apply tension or compression to the belt and friction between the sides of the V-belt in the sheave sections to prevent slippage. In operation, a force unbalance caused by changes in the axial loading of the sheave sections causes the V-belt to change its radial positions in the two pulleys until a force balance is achieved or a limit range stop is reached.

For a large transmitted torque, the required axial forces exerted on the sheaves result in large compressive forces on the V-belt which requires that the belt have a substantial thickness to prevent its axial collapse or failure. This increase in thickness increases the belt's centrifugal force and causes higher belt tension load. In addition, as the belt thickness increases, the pulley size must be increased due to higher stress loads at a given design minimum pulley radius. Further, the typical V-belt must continuously "pull out" from the compressive sheave load on leaving each pulley which results in significant friction losses and belt fatigue which adversely affects the overall efficiency and operating life. Consequently, although variable speed pulley drives have successfully used V-belts in a wide range of applications, they have been severely limited in their power capabilities for more competitive smaller size equipment.

As a result of these inherent drawbacks to the use of V-belts in continuously variable transmissions, a second category has developed which may broadly be designated as flat belt drive continuously variable transmissions. As the name suggests, flat belts are employed between driven and driving pulleys which are dynamically individually variable in diameter to obtain the sought-after ratio changes. No axial movement between the two pulley rims is necessary. On the other hand, it is necessary to somehow effect the diametric variations of the individual pulleys, and in one particularly effective system, this function is achieved by causing a circular array of drive elements in each pulley to translate radially inwardly or outwardly in concert as may be appropriate to obtain a given effective diameter of the pulley. Variable speed flat belt transmissions of this particular type, and their associated control systems, are disclosed in U.S. Pat. Nos. 4,024,772; 4,295,836 and 4,591,351 as well as U.S. patent application Ser. No. 871,254 filed June 6, 1986, and now U.S. Pat. No. 4,714,452, all to Emerson L. Kumm. In all but the first patent enumerated above, the subject variable diameter pulley components have included a pair of pulley sheaves between which extend a series of belt engaging elements that are simultaneously moved both radially and circumferentially. In one exemplary construction, there is a series of twenty-four belt engaging elements such that an angle of fifteen degrees extends between runs of the belt coming off tangentially from one belt engaging element compared to that of an immediately adjacent belt engaging element.

Each pulley sheave includes two pairs of two disks (designated, respectively, the inner guideway disk and the outer guideway disk in each pair) which are parallel to each other with the inner and outer guideway disks of each pair being disposed immediately adjacent one another. Each of the guideway disks of an adjacent pair has a series of spiral grooves or guideways with the guideways of the pair oriented in the opposite sense such that the ends of the belt engaging elements are captured at the intersections of the spiral guideways. Thus, the radial adjustment to the belt engaging elements may be achieved by bringing about relative rotation between the inner and outer guideway disks to change their angular relationship, this operation being, of course, carried out simultaneously and in coordination at both pairs of guideway disks of a pulley. Thus, it will be appreciated that the overall transmission ratio is dependent upon the respective angular relationships between the facing pairs of guideway disks on each of the two pulleys.

From the foregoing, it will be understood that the control system which establishes the instantaneous angular relationship between the facing disks of each pair on each of the pulleys is a highly important system within the entire continuously variable transmission. A series of related disadvantages has been characteristic of the prior art control systems for establishing these angular relationships. More particularly, these disadvantages include the fact that the mechanical components of the prior art hydraulic/mechanical control systems have been physically large and heavy, contributing the majority of the overall size of these continuously variable transmissions and accounting for a large portion of their weight. Also, the prior art control systems have required substantially larger hydraulic supply pressures to achieve the desired control response rates. As a result, the hydraulic control systems have been, of necessity, correspondingly complex, further contributing to the size, weight and cost of the prior art continuously variable transmissions.

It is to provide a control system which overcomes these several related objections to the prior art control systems for flat belt continuously variable transmissions that my invention is directed.

OBJECTS OF THE INVENTION

It is therefore a broad object of my invention to provide an improved flat belt continuously variable transmission.

It is another object of my invention to provide, in such a continuously variable transmission, an improved control system for establishing the effective transmission ratio between an input shaft and an output shaft coupled by a flat belt.

It is a still further object of my invention to provide such a control system which is relatively small, lightweight, simple and inexpensive.

It is yet another object of my invention to provide a continuously variable transmission in which the transmission speed ratio may be more rapidly changed than in the past.

In another aspect, it is a more specific object of my invention to provide such a control system which is self-energized from the energy transmitted to the pulley.

Still more specifically, it is an object of my invention to provide such a control system in which the effect of centrifugal forces exerted by relatively heavy belt-engaging elements are used to advantage and compensated for as necessary.

SUMMARY OF THE INVENTION

Briefly, these and other objects of my invention are achieved by providing, in a flat belt continuously variable ratio transmission, a control system which obtains the energy necessary to effect pulley diameter changes from the energy source driving the pulley and belt assembly rather than from an external source. The inside and outside guideway disks on both sides of each pulley are connected together using differential gearing which is also coupled to a power consuming element. While it is possible to use many different arrangements of differential gearing to obtain the desired operating torques between the inner and outer guideway disks, the presently preferred embodiment of the invention employs a harmonic gear drive to provide the differential geared relationship between the inner and outer guideway disks and a power consuming element. The harmonic drive consists of an elliptically shaped wave generator and a flexible splined gear sleeve (the flexspline) geared to two circular, internally splined rings designated the dynamic spline and the circular spline, respectively. The circular spline typically has two more splines or teeth than the dynamic spline and the flexspline (which have the same number) resulting in a speed reduction between the wave generator and the dynamic spline equal to one-half of the number of splines on the dynamic spline. Hence, with the harmonic drive, it is possible to obtain speed reductions or torque increases from the wave generator to the circular spline or dynamic spline exceeding 100 to 1 in a single stage of gearing.

In the preferred embodiment of the continuously variable transmission disclosed in the above referenced parent patent application Ser. No. 051,922, for the driven pulley, the circular spline is connected to the inner guideway disks and the dynamic spline is connected to the outer guideway disks. Conversely, for the driving pulley (which is connected to the external power source such as a motor or engine), the dynamic spline is connected to the inner guideway disks and the circular spline is connected to the outer guideway disks. The orientation of the guideway disks as related to the direction of rotation of the pulleys must be as specified in the previously referenced U.S. patent application Ser. No. 871,254, now U.S. Pat. No. 4,714,452. With this arrangement, a drag torque provided by an output power consuming element connected to the wave generator of each pulley assembly gives a substantially proportional pulley actuator torque which, working through the harmonic gear drive, tends to move the belt engaging elements of the pulley radially outwardly. Hence, a fixed length belt can be tensioned around two rotating pulleys for transmitting torque using a drag torque on the output power consuming element in each pulley to achieve a self-energized actuator drive. Since very high gear ratios may be used, correspondingly small torques (and hence small powers) are transferred to the output power consuming element to thereby permit the generation of large actuator torques to be applied for maintaining a constant speed ratio in the CVT or, when desired, to change the CVT speed ratio by an appropriate transient application to dynamically adjust the angular relationships between the inner and outer guideway disks for each pulley.

While numerous arrangements can be used for the control torque absorption on the output power consuming element (including an electrical power generator, a friction clutch, an air compressor, variable viscous fluid coupling, etc.), the employment of a positive displacement oil gear pump for this operation permits a wide range of drag torques to be effected simply by opening and closing an output valve to variably load the oil pump. In a refinement of the control system, the oil pumps may selectively transiently operate as motors during rapid ratio changes. An oil supply subsystem is correspondingly transiently actuated to facilitate this temporary mode of operation.

In the disclosure of the parent application, the use of relatively lightweight belt-engaging elements was assumed with such materials as aluminum, ceramic and plastic contemplated. However, it is desirable to consider the use of more dense belt engaging elements (i.e., those made of steel, powdered steel alloys, etc.), which have fatigue strengths much higher than aluminum, ceramic or plastic, as the design pulley power is increases. When such relatively dense belt drive elements are employed, the centrifugal forces caused by pulley rotation and tending to counter rotate the two sets of discs in each pulley in the direction that moves the belt engaging elements radially outwardly become dominant, and these centrifugal forces can be used to advantage. Thus, at high rotational pulley speeds, the torques generated by the centrifugal forces acting on the heavier belt engaging elements may be balanced by the torque of a hydraulic unit through the differential gearing of a harmonic drive if the specific connections between the dynamic spline or circular spline and the inner or outer guideway discs are reversed from those employed with the lighter weight belt engaging elements. In addition, for rotational speeds below those at which the centrifugal forces are dominant, the hydraulic units may be operated as motors, under the influence of a revised hydraulic control subsystem, to, in effect, return the CVT to the same mode of operation employed with the lighter weight belt engaging elements.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIGS. 4a, 4b and 4c are illustrations showing the principle of operation of a harmonic drive, certain components being shown in an exaggerated elliptical shape in order to more clearly demonstrate the principle;

FIG. 5 is a simplified cross sectional view of a flat belt continuously variable transmission illustrating the fundamental aspects of the mechanical components of the subject control system for establishing the angular relationship between the inner and outer guideway disks of each pulley;

FIG. 6 illustrates a hydraulic control subsystem for use in conjunction with the mechanical control subsystem illustrated in FIG. 5 to establish the angular relationship between inner and outer guideway disks according to the load and other demands;

FIG. 7. is a view similar to FIG. 5 illustrating a variant embodiment of the continuously variable transmission in which relatively heavy belt engaging elements are employed; and FIG. 8 is a view similar to FIG. 6 and illustrating a hydraulic control system suitable in conjunction with the mechanical control subsystem shown in FIG. 7.

DETAILED DESCRIPTION OF THE INVENTION

Figure 1:
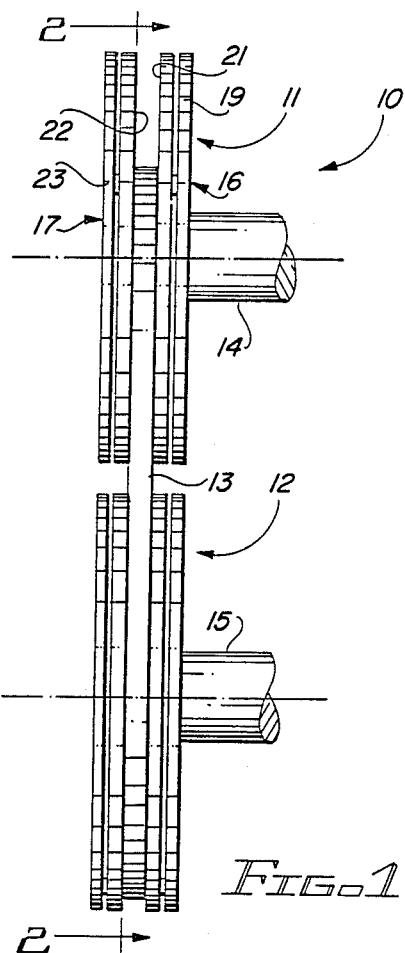
FIG. 1 illustrates an edge on view of driving and driven pulleys coupled by a flat belt and representative of the class of continuously variable transmissions in which the present invention finds application.
Figure 2:
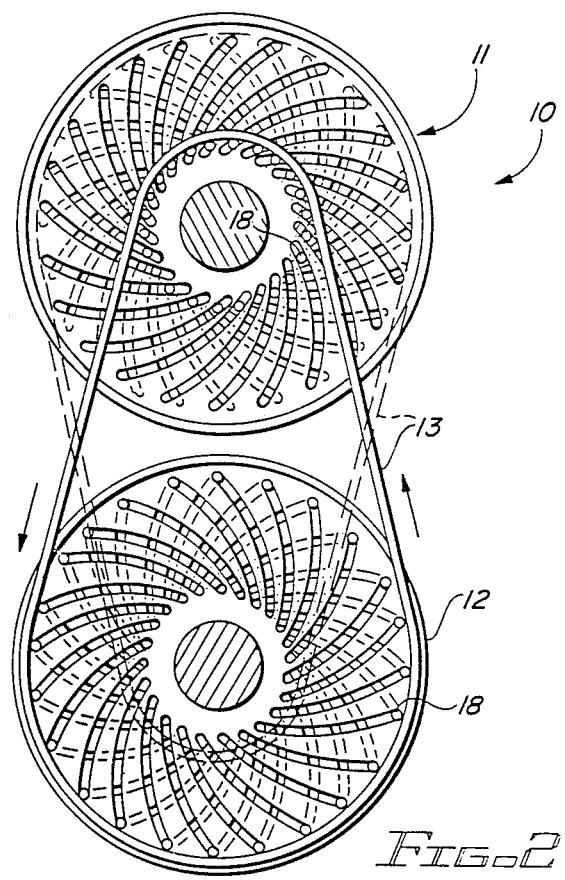
FIG. 2 is a cross sectional view, taken along the lines 2—2 of FIG. 1, of the pulley system illustrated in FIG. 1.
Figure 3:
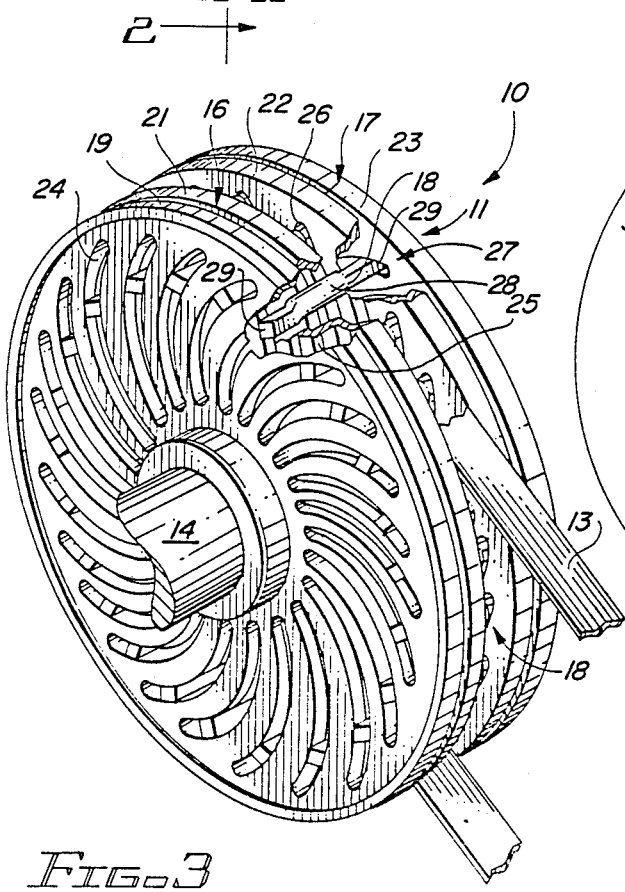
FIG. 3 is a fragmentary perspective view, partially broken away, of a pulley particularly illustrating the relationships between inner and outer guideway disk components and belt engaging element components.

Referring now to FIGS. 1, 2 and 3, fundamental aspects of the flat belt type of a continuously variable transmission, with which the subject control system is employed, are illustrated as embodied in a variable diameter pulley drive assembly 10 comprising variable diameter pulleys 11 and 12 connected by a flat drive belt 13. The pulley 11 will be considered as the driving pulley and the pulley 12 as the driven pulley in this discussion, but it will be understood that the roles of these pulleys may be reversed without altering the concepts involved.

The pulley 11 is appropriately mounted on a shaft 14, and the pulley 12 is similarly appropriately mounted on a shaft 15 as is well understood in the art. The pulleys 11 and 12 are similar to each other, and only one of them, namely 11, will be specifically described in this discussion. The belt 13 as shown in FIG. 3 corresponds to the position of the belt 13 of FIG. 2 in the dashed line position.

The pulley 11 includes a pair of pulley sheaves 16 and 17 between which extend a series of belt engaging elements 18, the latter being engaged by the belt 13 for driving, or driven, conditions as will be understood. In one construction of the invention, there is a series of twenty-four belt engaging elements 18 equally circumferentially distributed whereby there is established an angle of fifteen degrees between runs of the belt 13 coming off tangentially from one belt engaging element 18 as compared to that of an immediately adjacent belt engaging element 18. Each belt engaging element 18 includes a central shank 28, which engages the belt 13, and bearing regions 29 at each end.

The pulley sheave 16 comprises a pair of pulley guideway disks 19 and 21 which are parallel to and lie immediately adjacent each other in juxtaposition. Similarly the pulley sheave 17 comprises a pair of pulley guideway disks 22 and 23 which are parallel to and lie immediately adjacent each other in juxtaposition. The longitudinal spacing between the pulley sheaves 16 and 17 (i.e., the axial spacing between guideway disks 21 and 22) remains the same irrespective of the radial adjustment of the belt 13 for different driving or driven speeds. This spacing is sufficient to accommodate with clearance the width of belt 13 which is selected to carry the load that the system is designed for as is well understood.

The range of radial adjustment or position of the belt 13 on the pulley 11, as may be envisioned by the solid line and dashed line positions of belt 13 in FIG. 2, is achieved by altering the radial positions of the belt engaging elements 18. For example, in FIG. 2 the belt engaging elements 18 are close to the center of the shaft 14 in the solid line position of the belt 13 on pulley 11; conversely, the belt engaging elements are radially farther out, namely adjacent the periphery, when the belt 13 is in its dashed line position which is also the position shown in FIG. 3.

Variation in the radial positions of the belt engaging elements 18 is achieved by relative rotation to change the angular relationship between the outer guideway disk 19 and the inner guideway disk 21 of pulley sheave 11 and by identical relative rotation of the pulley guideway disks 22 and 23 of pulley sheave 17. As a practical matter, to insure synchronous operation, the inner guideway disks 21 and 22 are physically locked together, and the outer guideway disks 19 and 23 are also locked together. Power for such operation, not shown in FIGS. 1, 2 or 3, has been achieved in the prior art typically as disclosed in U.S. Pat. No. 4,295,836 previously referenced.

The outer guideway disk 19 has a series of logarithmic spiral guideways 24 therein which progress outwardly from adjacent the center at an angle of forty-five degrees with respect to the pulley radius. Simiarly the inner guideway disk 21 has a series of logarithmic spiral guideways 25 radiating outwardly at an angle of forty-five degrees with respect to the pulley radius, but in the opposite sense to the guideways 24 of pulley disk 19. Since the guideways 24 and 25 radiate outwardly at angles of forty-five degrees with respect to the pulley radius, but in opposite senses, the intersections of these guideways exist at ninety degrees at all radial positions. This results in a substantially constant geometry at the intersections of the logarithmic spiral guideways 24 and 25 at all radial positions for receiving the bearing region ends 29 of the belt engaging elements 18. Similarly, the inner guideway disk 22 has a series of logarithmic spiral guideways 26 radiating outwardly identically to the guideways 25 of inner guideway disk 21, and the outer guideway disk 23 includes logarithmic spiral guideways 27 extending outwardly identically to the guideways 24 of outer guideway disk 19. Hence, the guideways 26 and 27 intersect at ninety degrees at all radial positions to give a constant intersection geometry identical to the logarithmic spiral guideways 24 and 25 for receiving the other ends of the belt engaging elements 18.

While forty-five degree spirals have been shown and give ninety degree intersections, it will be understood that logarithmic spirals of other angularities may be used as desired. Also, minor variations from a particular angularity may be tolerated so long as the belt engaging element bearing ends supported at the guideway intersections will move appropriately when the sheaves are rotated relative to each other to change the angular relationship between the inner and outer guideway disks.

It will be clear that the belt 13, as it passes around the pulley 11 or 12, engages the central portion of the belt engaging elements 18 and causes one pulley to drive and the other pulley to be driven in the obvious fashion.

The foregoing description of the basic drive system, the pulleys 11 and 12, the belt 13 and the belt engaging elements 18 is set forth in greater detail in U.S. Pat. No. 4,295,836, dated Oct. 20, 1981, previously referred to and does not form a specific part of the invention described in this application, but forms the environment in which the invention functions.

Figure 4A:
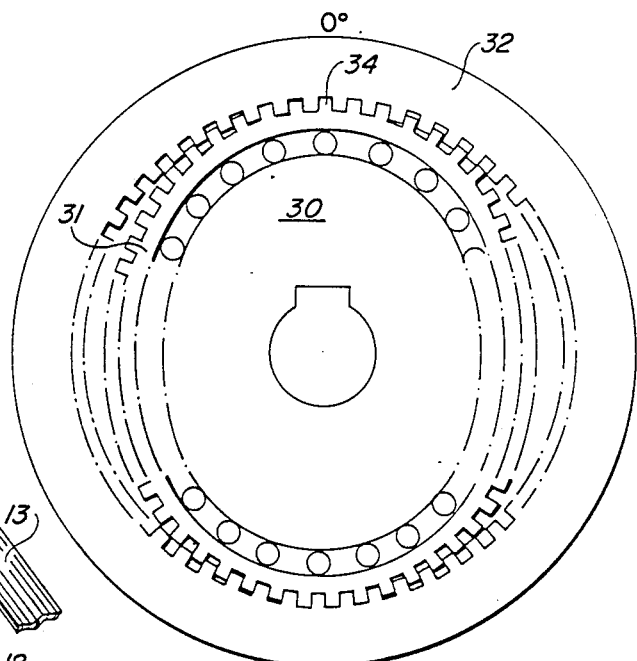

While it is possible to use many different differential gearing arrangements to obtain the desired operating torques between the inner and outer guideway disks of the pulleys (which, as will be seen below, is a necessary operation for practicing the present invention), the presently preferred embodiment employs a so-called "harmonic" gear drive to provide the differential geared relationship between the inner and outer guideway disks and certain power absorbing elements. Referring to FIGS. 4a, 4b and 4c, and particularly to the somewhat enlarged FIG. 4a, the basic principles of a harmonic drive gear reduction apparatus are presented. In this most elementary form, a harmonic drive employs three concentric components to produce high mechanical advantage and speed reduction. The use of nonrigid body mechanics allows a continuous elliptical deflection wave to be induced in a nonrigid external gear, thereby providing a continuous rolling mesh with a rigid internal gear. Thus, referring to FIG. 4a, an elliptical wave generator 30 deflects a flexspline 31 which carries outside teeth and therefore meshes with the inside teeth of a rigid circular spline 32. The elliptical shape of the flexspline and the amount of flexspline deflection is shown greatly exaggerated in FIGS. 4a, 4b and 4c in order to demonstrate the principle. The actual deflection is very much smaller than shown and is well within the material fatigue limits.

Since the teeth on the non-rigid flexspline 31 and the rigid circular spline 32 are in continuous engagement and since the flexspline 31 typically has two teeth fewer than the circular spline 32, one revolution of the wave generator 30 causes relative motion between the flexspline and the circular spline equal to two teeth. Thus, with the circular spline 32 rotationally fixed, the flexspline 31 will rotate in the opposite direction to the wave generator (the system input in the example) at a reduction ratio equal to the number of teeth on the flexspline divided by two.

This relative motion may be visualized by examining the motion of a single flexspline tooth 34 over one-half of an input revolution in the direction shown by the arrow 35. Since the input to the wave generator 30, in the example, causes clockwise rotation of the wave generator, the flexspline rotates counterclockwise. Thus, referring to FIG. 4b, it will be seen that the tooth 34, after one-quarter revolution of the wave generator 30, has moved counterclockwise one-half of one flexspline tooth position. It will also be noted that when the wave generator 30 axis has rotated 90°, the tooth 34 is fully disengaged. Full reengagement occurs in the adjacent circular spline tooth space when the major axis of the wave generator 30 is rotated to 180° as shown in FIG. 4c, and the tooth 34 has now advanced one full tooth position. This motion repeats as the major axis rotates another 180° back to zero, thereby producing the two tooth advancement per input revolution to the wave generator 30.

Conventional tabulations of harmonic drive gear reduction ratios assume the flexspline is the output member with the circular spline rotationally fixed. However, any of the drive elements may function as the input, output or fixed member depending upon whether the gearing is used for speed reduction, speed increasing or differential operation.

The harmonic drive principle can be extended by the addition of a fourth element designated the dynamic spline. The dynamic spline is an internal gear that rotates at the same speed and in the same direction as the flexspline. Unlike the circular spline (to which it is parallel, also engaging the flexspline), the dynamic spline has the same number of teeth as the flexspline. Flexspline shape rotation results in tooth engagement/disengagement within the same tooth space of the dynamic spline such that the ratio between the two is one to one. The system, therefore, is a flexspline output with the same characteristics as the three element harmonic drive model; i.e., gear reduction ratio tabulated with the direction of rotation opposite to the input. Ultra high dual ratio capability can be obtained by using two circular splines in mesh with the flexspline with each developing a different single-stage ratio. Merely by way of example, the compounding of single-stage ratios of 160:1 and 159:1 results in a total reduction ratio of 12,720:1. Harmonic drives suitable fo use in the present invention may be obtained from the Harmonic Drive Division of Emhart Machinery Group in Wakefield, Mass.

The subject invention, in the presently preferred embodiment, employs a four element harmonic drive in which the fourth element is a dynamic spline. Referring now to FIG. 5, a slightly simplified representation of a flat belt continuously variable transmission according to the present invention is shown. Preliminarily, it may be noted that, with the proper connection of the dynamic spline or the circular spline to the inner guideway disks or the outer guideway disks on a given rotating pulley using the guideway disk orientation as related to the direction of pulley rotation and direction of power flow as given in the previously referenced U.S. patent application Ser. No. 871,254 (now U.S. Pat. No. 4,714,452), a drag torque on a power consuming element connected to the wave generator can be caused to give a largely proportional force which tends to move the belt engaging elements radially outwardly. As a result, a fixed length belt can be tensioned around two rotating pulleys for transmitting torque using a drag torque on the energy consuming element in each pulley to give a self-energized actuator drive. Since very high ratios (greater than 100:1) may be used, very small torques (and hence small powers) transmitted to the power absorbing element achieves the generation of large actuator torques to be applied in positioning the belt engaging elements of the continuously variable transmission pulleys.

In FIG. 5, the pulley assembly 40 may be deemed the driving pulley (which receives torque via the input shaft 42 from an external power source not shown such as an engine or motor) and the pulley assembly 41 may be deemed the driven pulley which receives power via the flat belt 43 which is applied to an output shaft 44. As may be appreciated from the manner in which FIG. 5 is cross hatched, the inner guideway disks 45 of the pulley assembly 40 are physically connected together to effect an inner guideway disk structure. Simlarly, the outer guideway disks 46 of the pulley assembly 40 are also connected together to effect an outer guideway disk structure. The inner guideway disks 47 and the outer guideway disks 48 of the driven pulley assembly 41 are similarly connected. Briefly comparing FIG. 5 to FIGS. 2 and 3, the inner guideways disks 45 correspond to the inner guideway disks 21, 22; the outer guideway disks 46 correspond to the outer guideway disks 19, 23; and the directions of rotation are as indicated by the arrows in each Fig. to establish the correct relationship between the components, as discussed more fully in the previously referenced U.S. patent application Ser. No. 871,254 (now U.S. Pat. No. 4,714,452), which contribute to the correct operation of the subject invention.

A four element harmonic drive 50 differentially interconnects the outer guideway disks 46, the inner guideway disks 45 (which are fastened to the shaft 42), and an output drive 54 of the pulley assembly 40 to a power consuming element such as an oil pump 55. Similarly, as to the pulley assembly 41, a four element harmonic drive generator 51 differentially connects the outer guideway disks 48, the inner guideway disks 47 (which are fastened to the shaft 44), and an output drive 56 which is coupled to a second power consuming element such as an oil pump 57.

In the driving pulley assembly 40, the inner guideway disks 45 are connected to the dynamic spline 60 of the harmonic drive 50, and the outer guideway disks 46 are connected to the circular spline 61. The inner guideway disks 45 are connected to the shaft 42 by a collar 52 over one element of the outer guideway disks 46. The output drive 54 between the oil pump 55 and the harmonic drive 50 is coupled to the wave generator 58.

The driven pulley assembly 41 is similarly configured, but the positions of the dynamic spline and the circular spline are reversed. Thus, the circular spline 62 is connected to the inner guideway disks 47, and the dynamic spline 63 is connected to the outer guideway disks 48. The inner guideway disks 47 are connected to the shaft 44 by collar 53 over one element of the outer guideway disks 48. The output drive 56 to the oil pump 57 is coupled to the wave generator 59 of the harmonic drive 51.

Any constant radial position for the belt engaging elements 64 (driving pulley assembly 40) or 65 (driven pulley assembly 41) results in all components of the harmonic drive for that pulley assembly (i.e., the wave generator, the flexspline, the dynamic spline, and the circular spline) rotating at the same speed as the pulley shaft. Hence, the power consuming element (the oil pumps 55 or 57 in FIG. 5) rotates at a speed proportional to the shaft speed producing a hydraulic oil flow whose pressure output (against which it works) can be changed by a control valve. It can be shown that the drag torque of the positive displacement oil pump used as the power consuming element is substantially proportional to the generated oil pressure. Thus, the actuator torque in the pulley can be maintained constant at any belt drive radius and pulley speed by holding the positive displacement pump discharge pressure constant. Consequently, the pulley speed ratio may be changed by increasing the actuator torque on one pulley versus the other.

For example, if a higher output speed is desired for a given input speed, increasing the discharge pressure on the oil pump 55 would cause the wave generator 58 to transiently rotate more slowly relative to the shaft 42 causing the circular spline 61 connected to the outer guideway disks 46 to rotate more slowly relative to the inner guideway disks 45 connected to the shaft 42. The movement of the inner guideway disks relative to the outer guideway disks causes the intersections of the guideways, and hence the belt engaging elements 64, to move radially outwardly in the driving pulley assembly 40. With a fixed length belt, this can only happen if the belt drive radius in the driven pulley assembly 41 simultaneously decreases. An increase in belt tension due to the increase in actuator torque in driving pulley assembly 40 will result in increasing the torque on the power consuming unit, oil pump 57, in the driven pulley assembly 41 subsequently increasing the rotational speed of the oil pump 57 as the belt drive radius of driven pulley assembly 41 is decreasing.

Torque can be transmitted in either direction through the harmonic drives 50, 51 although the drive efficiency is a few percentage points lower when transmitting power from the circular spline or dynamic spline to the wave generator as compared to the reverse case. This is not a substantial concern in the subject system since operation at any constant speed ratio gives very low power losses in the transmission of power to the output power consuming elements (oil pumps 55, 57) since, again, there is no change in the relative position of any elements in the pulleys or harmonic drives during operation at a constant transmission ratio. When a speed change occurs, the temporary increase in power loss is inversely dependent upon the time that it takes for the speed ratio change to be completed. Typically, the angular movement of the outer guideway disks relative to the inner guideway disks of a given pulley for maximum radius ratio change (speed ratio change) is about 100° of angular shift. Hence, if this change occurs in one second (typical of a maximum speed change), this corresponds to a 16.7 RPM speed of the inner guideway disks relative to the outer guideway disks for that period. Given an examplary 100:1 harmonic drive, a temporary change in the power consuming unit of 1667 RPM is brought about. Increasing the rotational rate of the drive to the oil pump 57 by 1667 RPM for one second will cause the output pulley assembly 41 to increase in speed and require a decrease in the oil pump 55 in the driving pulley 40 by 1667 RPM for the same one second period using pulleys of the same size.

The discharge oil pressure from the oil pump 55 in the driving pulley assembly 40 may be increased by restricting its output control valve flow area to effect such a decrease in the oil pump 55 speed and provide the higher actuator torque to move the belt engaging elements 64 radially outwardly. The simultaneous increase in the speed of the oil pump 57 of the driven pulley 41 can simultaneously be aided by opening its output control valve flow area.

In an automotive application for the continuously variable transmission, the output shaft 44 of the driven pulley assembly 41 is geared directly to the vehicle wheels so that the rotational rate of the driven pulley assembly is directly proportional to the vehicle speed. The inertia of a vehicle does not permit the absolute value of the driven pulley assembly's 41 speed to increase very rapidly (i.e., in a second or two). However, the more critical operation for an automotive continuously variable transmission installation consists of obtaining maximum vehicle acceleration at any drive speed. This corresponds to rapidly accelerating the engine connected to the driving pulley assembly 40 to a higher speed to give more power to accelerate the vehicle. In such a case, the discharge oil pressure from the oil pump 57 of the driven pulley assembly 41 would be increased by restricting its output control valve flow area to effect a decrease in the oil pump 57 speed and give higher actuator torque to move the belt engaging elements 65 radially outwardly. The simultaneous increase in the speed of the oil pump 55 of the driving pulley assembly 40 can also be aided by opening its output control valve flow area. The overall resulting output torque from the continuously variable transmission versus time depends on many factors, but chiefly the inertia of the engine and the other components and the controlled output pressures of the oil pumps 55, 57.

The simultaneous rate of increase in the speed of the oil pump 55 or 57 can be aided by operating the accelerating oil pump as a motor for a brief time duration (e.g., a second to a few seconds for any one speed change). This feature can be incorporated by transiently supplying oil to the oil pump functioning as a motor from an independent boost pump, under control of an appropriate solenoid valve, for the very brief duration required to accommodate the rapid engine input speed acceleration or deceleration. The boost pump volume flow must be adequate for the maximum flow requirement, but the boost pressure can be relatively low thus keeping the motor power requirement to about 5-10% of the minimum oil pump power. The control system must always maintain adequate belt tension to prevent slippage during speed ratio changes.

One or more circumferential springs (represented schematically by the springs 68, 69 in FIG. 5) may also be incorporated in each actuator drive oriented to give a torque between the inner guideway disks and outer guideway disks whose direction would cause the belt engaging elements to be moved radially inwardly in the driving pulley assembly 40 and radially outwardly in the output or driven pulley assembly 41. This arrangement permits the continuously variable transmission to start operation at a maximum output torque to input torque ratio with the belt under some tension at all times to avoid initial slippage. Such springs also are helpful in obtaining a maximum speed increase of the driving pulley assembly 40 relative to the driven pulley assembly 41 as desired during the acceleration of the vehicle; i.e., if the oil pressure on the oil pump 55 is reduced sufficiently, the circumferential spring torque must help drive the belt engaging elements 64 radially inwardly permitting very rapid engine acceleration. However, the specific desired changes as applied to the automotive continuously variable transmission application normally require that there is no net loss in output torque during operator-demanded vehicle acceleration that has a duration of more than about 0.1 second. As a result, the rate and magnitude of output pressure changes in the oil pumps 55, 57 have the major effect.

Consider now the exemplary hydraulic control subsystem which determines the input and output pressures of the oil pumps 55, 57 for the reasons previously discussed to control the speed ratio between the driving pulley assembly 40 and the driven pulley assembly 41 via the belt 43, all as shown in FIG. 6. Oil from a reservoir 70 is supplied, through conduit 71 and check valves 72, 73, to the suction sides 74, 75, respectively, of oil pumps 55, 57. The pressure sides 76, 77, respectively, of the oil pumps 55, 57 are connected, by respective conduits 78, 79, back to the reservoir 70 after the oil has passed through a cooler 80. The conduit 78 includes an inline pressure sensor 81 and, downstream of the pressure sensor 81, a flow rate control valve 82. Similarly, the conduit 79 includes an inline pressure sensor 83 and a flow rate control valve 84 downstream from the pressure sensor 83.

The status of the flow rate control valves 82, 84 is determined by outputs from a control module 86 which receives input information from the pressure sensors 81, 83 and from external sources such as engine speed and throttle position. When the control module senses that the pressures existing in the cnduits 78 and 79, from the sensors 81, 83 (and hence the transmission ratio between the pulley assemblies 40, 41), are incorrect for sensed engine speed and throttle position conditions (as, for example, during rapid acceleration), the control module responds by increasing the flow area through the flow rate control valve 82 and decreasing the flow area through the flow rate control valve 84 which momentarily slows the oil pump 57 and speeds the oil pump 55 until the effective radius of the driving pulley assembly 40 is decreased and that of the driven pulley assembly 41 is increased to reach a new and correct system balance point. Also, when decelerating and using the engine as a partial vehicle brake, the control module 86 causes the flow rate through the flow rate control valve 84 to decrease and that through the flow rate control valve 82 to increase, momentarily slowing the oil pump 57 and accelerating the oil pump 55 until a system balance is again achieved.

As previously discussed, under certain conditions, the response speed of the oil pump 55 or 57 whose speed is being increased can be facilitated by permitting it to operate briefly as a motor. This feature is accomplished with the addition of a low pressure pump 88 driven by a motor 89. The pump 88 is supplied from the reservoir 70 and is connected, via conduits 90, 91, 92 to the suction sides 74, 75 of the oil pumps 55, 57, respectively. A solenoid operated valve 93 in line in the conduit 91, when opened under the influence of the control module 86, supplies an extra volume of oil to the suction side 74 of the pump 55 to permit its transient operation as a motor. Similarly, solenoid operated valve 94, in line in the conduit 92, when opened under the influence of the control module 86, permits the pump 88 to supply an extra volume of oil to the suction side 75 of the pump 57 to permit its transient operation as a motor. The pump 88/motor 89 and the solenoid operated valves 93, 94 need only be operated when rapid transmission ratio changes are undertaken and only facilitate that rapid change. Thus, it will be appreciated that the portion of the hydraulic circuit including the pump 88, the conduits 90, 91, 92 and the solenoid operated valves 93, 94 is optional and may not be required for all systems.

The preceding description of the operation and specific connections between the inner guideway discs and dynamic spline or circular spline and also between the outer guideway discs and circular spline or dynamic spline for the input and output power pulleys assume the use of relatively light weight belt engaging elements. Such belt engaging elements may be made typically of aluminum, ceramic or plastic for low weight. The belt engaging elements are acted upon by centrifugal force caused by pulley rotation and, due to their positions in the guideway discs, give torques operating to counter rotate the two sets of discs in each pulley in the direction that moves the belt engaging elements radially outwardly. The effect of the centrifugal force acting on the relatively light weight belt engaging elements of each pulley is usually insufficient to require provision for compensation in the control system.

However, it is desirable to consider the use of more dense belt engaging elements (i.e., those made of steel, powdered steel alloys, etc.), which have fatigue strengths much higher than aluminum, ceramic or plastic, as the design pulley power is increased. At high rotational pulley speeds, the torque generated by the centrifugal force of the heavier belt engaging elements may be balanced by the torque of a hydraulic pump through the differential gearing of a harmonic drive provided only that the specific connections between the dynamic spline or circular spline and the inner or outer guideway discs are reversed from those shown in the preceding description in which the use of relatively light weight belt engaging elements was assumed.

Thus, referring now to FIG. 7 which illustrates a flat belt continuously variable transmission employing belt engaging elements 164, 165 of significant weight, the driving pulley assembly 140 has its outer guideway discs 146 connected to the dynamic spline 160, and the inner guideway discs 145 are connected to the circular spline 161. Similarly, the driven pulley assembly 141 has its outer guideway discs 148 connected to the circular spline 162, and the inner guideway discs 147 are connected to the dynamic spline 163. It will again be noted that these relationships are reversed from those shown and discussed with reference to the embodiment illustrated in FIG. 5.

As the operating speeds of the pulley assemblies 140, 141 decrease, the centrifugal forces acting on the belt engaging elements 164, 165 decrease with the square of the speed change. Thus, at lower pulley assembly speeds, there is less torque on the guideway discs from this source and correspondingly less tendency to cause the belt engaging elements to move radialy outwardly. Therefore, at lower speeds, it is necessary to operate the hydraulic units 155, 157 connected to the wave generators 158, 159 of the harmonic drives as motors rather than as pumps in order to provide the necessary torque tending to move the belt engaging elements outwardly to obtain the required belt tension for transferring power between the pulleys without slippage. In a given continuously variable transmission employing the heavier belt engaging elements, the pulley assembly speed below which it is necessary to operate each of the hydraulic units 155, 157 as a motor rather than as a pump is dependent chiefly on the weight of the belt engaging elements 164, 165, the pulley torque and the overall effective friction factor between the belt 143 and the belt engaging elements. However, since the hydraulic flow rate to a fixed displacement hydraulic motor varies directly with its speed, the required auxiliary supply pump flow and power required are minimized by operating only in the lower speed regime of the pulleys.

The hydraulic control subsystem in this arrangement for using heavier, stronger belt engaging elements therefore requires an auxiliary pump to operate continuously at the lower pulley assembly speeds to supply the required hydraulic flows to the hydraulic units connected to the wave generators in the harmonic drives on the pulleys. (It may be noted that hydraulic flow requirements for a constant pulley torque will decrease as the speed decreases.)

An exemplary hydraulic control subsystem for performing this function is illustrated in FIG. 8. While this embodiment of the hydraulic control subsystem bears a substantial resemblance to that illustrated in FIG. 6, many of the signals and subsystem responses are reversed as a consequence of the differences in the mechanical configurations illustrated in FIGS. 5 and 7 as discussed immediately above. However, the primary functions of the hydraulic control subsystem illustrated in FIG. 8 remains the determination of the input and output pressures of the hydraulic units 155, 157 to control the speed ratio between the driving pulley assembly 140 and the driven pulley assembly 141 via the belt 143.

Thus, oil from a reservoir 170 is supplied, through conduit 171 and check valves 172, 173, to the suction sides 174, 175, respectively, of hydraulic units 155, 157. The pressure sides 176, 177, respectively, of the hydraulic units 155, 157 are connected, by respective conduits 178, 179, back to the reservoir 170 after the oil has passed through a cooler 180. The conduit 178 includes an inline pressure sensor 181 and, downstream of the pressure sensor 181, a flow rate control valve 182. Similarly, the conduit 179 includes an inline pressure sensor 183 and a flow rate control valve 184 downstream from the pressure sensor 183. A low pressure pump 188, driven by a motor 189, is supplied from the reservoir 170 and is connected, via conduits 190, 191, 192 to the suction sides 174, 175 of the hydraulic units 155, 157, respectively.

A solenoid operated valve 193 in line in the conduit 191, when opened under the influence of the control module 186, supplies an extra volume of oil to the suction side 174 of the hydraulic unit 155 to permit its operation as a motor. Similarly, solenoid operated valve 194, in line in the conduit 192, when opened under the influence of the control module 186, permits the pump 188 to supply an extra volume of oil to the suction side 175 of the hydraulic unit 157 to permit its operation as a motor. Sensors 195, 196 (for which there are no equivalent components in the hydraulic control subsystem illustrated in FIG. 5) are operatively disposed, respectively, between the solenoid operated valve 193 and the suction side 174 of the hydraulic unit 155 and between the solenoid operated valve 194 and the suction side 175 of the hydraulic unit 157. The pump 188/motor 189 and the solenoid operated valves 193, 194 need only be operated when the speed of the pulley assemblies 140, 141 fall below a rotational rate at which the centrifugal forces exerted by the belt engaging elements 164, 165 (FIG. 7) fall below a value at which they are the dominant forces.

The status of the flow rate control valves 182, 184, 194, 194 is determined by outputs from a control module 186 which receives input information from the pressure sensors 181, 183, 195, 196 and from external sources such as engine speed and throttle position. At operating speeds at which centrifugal force becomes a substantial factor, when the control module 186 senses that the pressures existing across the hydraulic units 155, 157 (and hence the transmission ratio between the pulley assemblies 140, 141), are incorrect for sensed engine and throttle position conditions (as, for example, during rapid acceleration), the control module responds by decreasing the flow area through the flow rate control valve 182 and increasing the flow area through the flow rate control valve 184 which momentarily slows the hydraulic unit 155 and speeds up the hydraulic unit 157 until the effective radius of the driving pulley assembly 140 is decreased and that of the driven pulley assembly 141 is increased to reach a new and correct system balance point. Also, when decelerating and using the engine as a partial vehicle brake, the control module 186 causes the flow rate through the flow rate control valve 184 to increase and that through the flow rate control valve 182 to decrease, momentarily speeding the hydraulic unit 157 and slowing the hydraulic unit 155 until a system balance is again achieved.

As previously mentioned, when the rotational speeds of the pulley assemblies 140, 141 fall below a value at which the centrifugal forces exerted by the belt engaging elements 164, 165 are substantial, the hydraulic control system illustrated in FIG. 8 must revert to operation similar to that of the hydraulic control system illustrated in FIG. 6. This is achieved by energizing the motor 189/pump 188 and additionally governing the flow areas through the flow rate control valves 193, 194, to provide pressures appearing on the suction sides 174, 175 of the hydraulic units 155, 157 (as sensed by the sensors 195, 196) such that the hydraulic units operate as motors rather than pumps in this lower speed range. The result is that, in this lower speed range, the hydraulic torque input (albeit reversed from the drags discussed in conjunction with the embodiment illustrated in FIGS. 5 and 6, exerted by the hydraulic units 155, 157) become the sole forces determining the transient adjustment of the relative positions of the inner and outer guideway discs in the pulley assemblies 140, 141 and hence the transfer speed ratio between them.

This operation may be summarized as follows: When the rotational speed of a pulley assembly is above a value at which the centrifugal force exerted by the belt engaging elements it carries becomes a dominant force, the control subsystem operates the corresponding hydraulic unit to effect a change in the angular relationship between the first and second guideway disks to cause a tendency for change in the radial positions of the belt engaging elements opposite to the tendency for change in the radial positions due to centrifugal force. Conversely, when the rotational speed of a pulley assembly is below a value at which the centrifugal force exerted by the belt engaging elements it carries becomes a dominant force, the control subsystem operates the corresponding hydraulic unit to effect a change in the angular relationship between the first and second guideway disks to cause a tendency for change in the radial positions of the belt engaging elements which are in the same direction as the tendency for change in the radial positions due to centrifugal force.

While the principles of the invention have now been made clear in illustrative embodiments, there will be immediately obvious to those skilled in the art many modifications of structure, arrangements, proportions, the elements, materials, and components, used in the practice of the invention which are particularly adapted for a specific environment and operating requirements without departing from those principles.

I claim:

1. A continuously variable transmission including driving and driven pulley assemblies coupled by a flat drive belt, each said pulley assembly comprising:
   (A) a shaft;
   (B) a pair of pulley sheaves;
   (C) a series of belt engaging elements, each said belt engaging element having:
   1. an elongated central shank including a drive surface adapted to be engaged by said drive belt;
   2. a first bearing region at a first end of said central shank; and
   3. a second bearing region at a second end of said central shank;
   (D) each said pulley sheave including:
   1. a pair of relatively movable guideway disks lying alongside each other in juxtaposition;
      a. an inner guideway disk of each said pair including a first series of guideways extending in one direction;
      b. an outer guideway disk of each said pair including a second series of guideways extending in a second direction;
      c. said first and second series of guideways providing intersections for capturing and locating said bearing regions of said belt engaging elements, said intersections providing locations for said bearing regions to establish radial positions of said belt engaging elements with respect to said shaft;
   2. means connecting said inner guideway disks of said pulley sheaves together to establish an inner guideway disk structure which rotates about said shaft;
   3. means connecting said outer guideway disks of said pulley sheaves together to establish an outer guideway disk structure which rotates about said shaft;
   4. means coupling at least one of said guideway disks to said shaft for rotation therewith;
   5. a hydraulic unit capable of operating as a hydraulic motor and as a hydraulic pump, said hydraulic unit having:
      a. an input for receiving hydraulic fluid; and
      b. an output for delivering hydraulic fluid;
   6. gear reduction means comprising a harmonic drive including:
      a. a wave generator coupled to said hydraulic unit;
      b. a flexspline;
      c. a circular spline connected to one of:
         i. said inner guideway disk structure; and
         ii. said outer guideway disk structure; and
      d. a dynamic spline connected to the remaining one of:
         i. said inner guideway disk structure; and
         ii. said outer guideway disk structure;
      said gear reduction means differentially coupling:
      a. said hydraulic unit;
      b. said inner guideway disk structure; and
      c. said outer guideway disk structure;
   7. a control subsystem for governing the operation of each said hydraulic unit by:
      a. selectively controlling the supply of hydraulic fluid to said input of said hydraulic unit; and b. selectively controlling the discharge of hydraulic fluid from said output of said hydraulic unit;

whereby:

8. when the rotational speed of said pulley assembly is above a value at which the centrifugal force exerted by said belt engaging elements becomes a dominant force, operating said hydraulic unit to effect a change in the angular relationship between said first and second guideway disks communicated through said gear reduction means which causes a tendency for change in the radial positions of said belt engaging elements opposite to the tendency for change in the radial positions of said belt engaging elements due to centrifugal force; and 9. when the rotational speed of said pulley assembly is below a value at which the centrifugal force exerted by said belt engaging elements becomes a dominant force, operating said hydraulic unit to effect a change in the angular relationship between said first and second guideway disks communicated through said gear reduction means which causes a tendency for change in the radial positions of said belt engaging elements in the same direction as the tendency for change in the radial positions of said belt engaging elements due to centrifugal force.

2. The continuously variable transmission of claim 1 in which, in said driving pulley assembly:
   (A) said circular spline is connected to said inner guideway disk structure; and
   (B) said dynamic spline is connected to said outer guideway disk structure;
and in which, in said driven pulley assembly:
   (C) said circular spline is connected to said outer guideway disk structure; and
   (D) said dynamic spline is connected to said inner guideway disk structure.

3. The continuously variable transmission of claim 2 which further includes, in said control subsystem:
   (A) a hydraulic fluid pump having an output coupled to said input of each said hydraulic unit;
   (B) a solenoid-operated valve in line between said output of said hydraulic fluid pump and said input of each said hydraulic unit; and
   (C) a flow rate control valve in line with the output from said hydraulic unit;
and in which:
   (D) the operation of said hydraulic unit as a motor is obtained by opening said solenoid-operated valve; and
   (E) the load of said hydraulic unit is varied by changing the flow area through said flow rate control valve.

4. The continuously variable transmission of claim 3 which further includes:
   (A) in said driving pulley assembly, first spring bias means connected to said inner and outer guideway disk structures to urge said inner and outer guideway disk structures toward relative movement which would move said belt engaging elements radially inwardly; and
   (B) in said driven pulley assembly, second spring bias means connected to said inner and outer guideway disk structures to urge said inner and outer guideway disk structures toward relative movement which would move said belt engaging elements radially outwardly.

* * * * *